(12) United States Patent
Back et al.

(10) Patent No.: US 11,125,296 B2
(45) Date of Patent: Sep. 21, 2021

(54) VIBRATION DAMPER

(71) Applicant: VIBRACOUSTIC GMBH, Darmstadt (DE)

(72) Inventors: Friedrich Back, Müllheim (DE); Udo Göbel, Neuenburg am Rhein (DE); Markus Dürre, Neuenburg am Rhein (DE); Christian Paul, Auggen (DE); Matthias Sommerhalter, Schliengen (DE)

(73) Assignee: VIBRACOUSTIC GMBH, Darmstadt (DE)

(*) Notice: Subject to any disclaimer, the term of this patent is extended or adjusted under 35 U.S.C. 154(b) by 0 days.

(21) Appl. No.: 16/327,420

(22) PCT Filed: Aug. 16, 2017

(86) PCT No.: PCT/EP2017/070784
§ 371 (c)(1),
(2) Date: Feb. 22, 2019

(87) PCT Pub. No.: WO2018/036884
PCT Pub. Date: Mar. 1, 2018

(65) Prior Publication Data
US 2019/0186577 A1 Jun. 20, 2019

(30) Foreign Application Priority Data
Aug. 25, 2016 (DE) ...................... 10 2016 115 782.1

(51) Int. Cl.
*F16F 7/108* (2006.01)
(52) U.S. Cl.
CPC .......... *F16F 7/108* (2013.01); *F16F 2222/08* (2013.01); *F16F 2230/007* (2013.01); *F16F 2230/0023* (2013.01); *F16F 2234/02* (2013.01)

(58) Field of Classification Search
CPC ........ F16F 7/104; F16F 7/108; F16F 2222/08; F16F 2230/007; F16F 2234/02
(Continued)

(56) References Cited

U.S. PATENT DOCUMENTS 2,736,393 A 2/1956 O'Connor
2,797,931 A 7/1957 Hans
(Continued)

FOREIGN PATENT DOCUMENTS

CH 275670 A 5/1951
CN 203906634 U 10/2014
(Continued)

OTHER PUBLICATIONS

International Search Report PCT/EP2017/070784, dated Nov. 6, 2017.
(Continued)

*Primary Examiner* — Thomas W Irvin
(74) *Attorney, Agent, or Firm* — Fishman Stewart PLLC

(57) ABSTRACT

A vibration damper for damping vibrations of a motor vehicle part including a retaining device attachable to the motor vehicle part, a damping mass, capable of vibrating with respect to the retaining device, and a spring device coupling the damping mass capable of vibrating to the retaining device. The damping mass may have at least one anti-loss device and/or path limiting device that may interact with the retaining device to limit a deflection of the damping mass with respect to the retaining device.

12 Claims, 3 Drawing Sheets

(58) Field of Classification Search
USPC .................................................. 188/379, 380
See application file for complete search history.

(56) References Cited

U.S. PATENT DOCUMENTS

| | | | |
|---|---|---|---|
| 3,596,924 A | 8/1971 | Watts | |
| 4,385,665 A | 5/1983 | Knoll | |
| 4,687,225 A | 8/1987 | Newton | |
| 5,413,318 A * | 5/1995 | Andreassen | B23B 29/022 |
| | | | 267/140 |
| 5,816,373 A | 10/1998 | Osterberg et al. | |
| 6,499,730 B1 * | 12/2002 | Kuwayama | F16F 7/108 |
| | | | 188/379 |
| 7,661,912 B2 * | 2/2010 | Onozuka | B23B 29/022 |
| | | | 408/143 |
| 9,297,435 B2 * | 3/2016 | Cerri | F16F 7/108 |
| 9,920,813 B2 * | 3/2018 | Kim | F16F 7/108 |
| 10,302,171 B2 * | 5/2019 | Kim | F16F 7/108 |
| 10,598,245 B2 * | 3/2020 | Sohn | F16F 7/108 |
| 10,626,945 B2 * | 4/2020 | Gebhardt | F16F 1/3732 |
| 10,738,853 B2 * | 8/2020 | Roeda | F16F 7/104 |
| 11,073,188 B2 * | 7/2021 | Reu wig | F16F 7/108 |
| 2004/0149531 A1 * | 8/2004 | Durre | B60G 13/16 |
| | | | 188/379 |
| 2008/0197549 A1 | 8/2008 | Hasegawa | |
| 2008/0237949 A1 * | 10/2008 | Hasegawa | F16F 7/108 |
| | | | 267/140 |
| 2010/0101906 A1 * | 4/2010 | Herold | F16F 7/1011 |
| | | | 188/379 |
| 2013/0092489 A1 * | 4/2013 | Hagelin | F02C 7/00 |
| | | | 188/379 |
| 2013/0118848 A1 * | 5/2013 | Mischler | F16F 7/108 |
| | | | 188/379 |
| 2015/0337916 A1 * | 11/2015 | Cerri | F16F 7/108 |
| | | | 188/379 |
| 2018/0274619 A1 * | 9/2018 | Gebhardt | F16F 7/108 |
| 2019/0360549 A1 * | 11/2019 | Sohn | F16F 7/108 |
| 2019/0383344 A1 * | 12/2019 | Roeda | F16F 1/3814 |
| 2020/0018372 A1 * | 1/2020 | Reu Wig | F16F 7/108 |
| 2020/0278007 A1 * | 9/2020 | Gustavsson | F16F 7/104 |

FOREIGN PATENT DOCUMENTS

| | | |
|---|---|---|
| CN | 104696407 A | 6/2015 |
| CN | 104696409 A | 6/2015 |
| CN | 105471124 A | 4/2016 |
| CN | 105887939 A | 8/2016 |
| DE | 3038711 C2 | 2/1992 |
| DE | 19547715 C1 | 5/1997 |
| DE | 69814832 T2 | 3/2004 |
| DE | 10327711 A1 | 1/2005 |
| DE | 102013104034 A1 | 10/2014 |
| EP | 0726409 A1 | 8/1996 |
| GB | 686463 A | 1/1953 |
| JP | H09-184538 A | 7/1997 |
| JP | 2005188716 A | 7/2005 |

OTHER PUBLICATIONS

CN Search Report 201780051621.4, dated May 8, 2020.
Translation of CN Office Action 201780051621.4, dated May 27, 2020.
Chinese Search Report, 2017800516214, dated Jan. 25, 2021.
Translation of Chinese Office Action, 201780051621.4, dated Feb. 1, 2021.
Chinese Office Action, 201780051621.4, dated Feb. 1, 2021.
Indian Office Action, 201917005304, dated Dec. 24, 2020.
Translation of Korean Office Action, 10-2019-7005412, dated Jun. 18, 2021.

* cited by examiner

VIBRATION DAMPER

This application is a National Stage patent application of International Patent Application No. PCT/EP2017/070784, filed Aug. 16, 2017, which claims the benefit of German Application Ser. No. 10 2016 115 782.1, filed Aug. 25, 2016, the contents of each are incorporated by reference in their entireties.

TECHNICAL FIELD

The present invention relates to a vibration damper for damping vibrations of a motor vehicle part, in particular of a tailgate or a roof of a motor vehicle, consisting of a retaining device attachable to the motor vehicle part, a damping mass capable of vibrating with respect to the retaining device, and a spring device coupling the damping mass capable of vibrating to the retaining device.

BACKGROUND

Vibration dampers of the aforementioned kind are used for dampening vibrations of motor vehicle parts in order to decouple the disturbing vibrations from a passenger cabin and thus to improve driving comfort. Conventional vibration dampers have a spring device and a damping mass capable of vibrating which is coupled to the motor vehicle part to be dampened via the spring mass. If the vibration damper attached to the motor vehicle part starts vibrating, the damping mass will vibrate along with it after a certain delay, wherein dampening of the vibrations takes place via the spring device. For instance, such a vibration damper is used to damp vibrations in the area of a tailgate or a roof of a motor vehicle.

SUMMARY

The present invention has for its object to provide a vibration damper, which has a long operating life and in addition is cost efficient to manufacture.

To achieve the object, a vibration damper with features of claim 1 is proposed.

Advantageous embodiments of the vibration damper are subject of dependent claims.

The vibration damper for damping vibrations of a motor vehicle part, in particular of a tailgate or a roof of a motor vehicle, comprises a retaining device attachable to the motor vehicle part, a damping mass capable of vibrating with respect to the retaining device, and a spring device coupling the damping mass to the retaining device in a manner capable of vibrating, wherein the damping mass has at least one anti-loss and/or path limiting device, interacting with the retaining device to limit a deflection of the damping mass with respect to the retaining device.

The anti-loss and/or path limiting device prevents an overloading of the spring device by limiting the deflection of the damping mass with respect to the retaining device. In particular, the anti-loss and/or path limiting device ensures that the damping mass can only move freely within given paths for damping the vibrations without unduly stressing or damaging the spring device. Thereby, complex safeguards are omitted which are to limit the deflection of the damping mass. Thus, the vibration damper has a long operating life. Moreover, the anti-loss and/or path limiting device prevents the damping mass from releasing completely from the retaining device in case of a failure of the spring device. Therefore, damage of motor vehicle parts as well as a loss of the damping mass can be avoided. Moreover, the vibration damper is easy and cost efficient to manufacture, since the spring device can be manufactured separately to the damping mass and the retaining device. Consequently, a modular system can be generated, which can be combined with various damping masses and/or retaining devices. Further, the vibration frequency of the vibration dampers can be set up via the stiffness of the spring device and/or the form of the geometry of the spring device.

The vibration damper is preferably used for damping vibrations occurring on a tailgate or a roof of a motor vehicle, wherein the vibration damper is not limited to these motor vehicle parts. The vibration damper is attached to the motor vehicle part via the retaining device. The vibrations of the motor vehicle part are induced in the damping mass via the retaining device and the spring device. Thereby, the damping mass is deflated and excited to vibrate with respect to the retaining device. These vibrations are in turn damped by the spring device. Consequently, vibrations resulting from the motor vehicle part are effectively damped, so that the driving comfort is improved. The anti-loss and/or path limiting device thereby limits the deflection of the damping mass with respect to the retaining device.

In a preferred embodiment the anti-loss and/or path limiting device has pin elements interacting with the stop devices, which are integrated in the retaining device. Therefore, the deflection of the damping mass with respect to the retaining device can be limited, so that in case of a failure of the spring device an overloading of the spring device as well as a disengagement of the damping mass is effectively prevented. Furthermore, an anti-loss and/or path limiting device formed as pin elements can be manufactured easily and cost efficiently.

In a preferred embodiment, the pin elements are in a form-fit connection, in a force-locking connection and/or in a bonded connection with the damping mass. The pin elements can be formed as studs, which can be manufactured from the same material as the damping mass. To that end, the studs can be integrally turned from a section of the damping mass. Further, the pin elements can be separately manufactured and a section of the pin elements can be in a form-fit connection, in a force-locking connection and/or in a bonded connection with the damping mass. For example, the sections of the pin elements can be pressed into openings provided in the damping mass. Moreover, the sections of the pin elements can be in a bonded connection with the damping mass, for instance by welding. Moreover, the sections of the pin elements can be formed as threaded pins, which are screwed into threaded holes provided in the damping mass.

Preferably, on each front face of the damping mass a pin element is arranged. In particular, each pin element is in a form-fit connection, in a force-locking connection and/or in a bonded connection with a front face of the damping mass.

Therefore, the deflection of the damping mass with respect to the retaining device can be limited, so that an overloading of the spring device as well as a disengagement of the damping mass is effectively prevented in case of a failure of the spring device. In particular, the pin elements are arranged on the front faces of the damping mass such that their longitudinal axes are aligned with the longitudinal axis of the damping mass.

The stop device can be formed as receiving eyes, wherein the pin elements engage into the receiving eyes. In particular, the receiving eyes are integrally formed with the retaining device. The receiving eye can be formed as openings provided in the retaining device. Further, the openings can be provided with sleeve-like extensions. Preferably, the inner diameter of the receiving eyes are larger than an outer diameter of the pin elements, so that the pin elements can move with respect to the retaining device along the specified path length inside the receiving eyes, when the damping mass is deflected. Accordingly, the inner diameter of the receiving eyes and the outer diameter of the pin elements define the maximum deflection of the damping mass.

The anti-loss and/or path limiting device preferably limits the deflection of the damping mass perpendicular to the longitudinal axis of the damping mass.

In a preferred embodiment, the spring device has two elastomer springs. Vibrations induced by the motor vehicle part are damped by the elastomer springs. Preferably, the first elastomer spring is connected with a first end to the damping mass and with a second end to the retaining device and a second elastomer spring is connected with a first end to the damping mass and with a second end to the retaining device. Further, the vibration frequency of the vibration damper can be adjusted via the stiffness of the elastomer springs and/or the design of the elastomer spring geometries.

In a preferred embodiment the elastomer springs are in a form-fit connection, a force-locking connection and/or in a bonded connection with the damping mass and/or the retaining device. Thus, a respective one of the elastomer springs can be vulcanized onto a respective one of the front faces of the damping mass and/or onto the retaining device. Further, it is also conceivable, that the elastomer springs are vulcanized separately and are subsequently connected to the damping mass and/or to the retaining device. Therefore, the vulcanization tool does not longer depend on the geometry of the damping mass, so that no new vulcanization tool has to be constructed for further variations having altered damping mass geometries. Thus, the manufacturing costs can be reduced with a vibration damper having separately vulcanized elastomer springs. Further, through the separate vulcanization a modular system emerges which may be combined with various damping masses and/or retaining devices. A separately vulcanized elastomer spring can be in a form-fit connection and/or in a force-locking connection with the retaining device, in particular with the receiving eye integrated into the retaining device. To that end, the elastomer spring can have an end-side circumferential latching nose, by means of which the elastomer spring can be tied to, in particular snapped into, the receiving eye. Preferably, a separately vulcanized elastomer spring is in a form-fit connection and/or in a force-locking connection with the damping mass. A separately vulcanized elastomer spring can be preloaded when being attached to the damping mass, in order to prevent a disengagement of the elastomer spring from the damping mass during a movement of the damping mass.

In a preferred embodiment, the elastomer springs are formed as hollow cylinders, wherein the hollow cylinders have through openings, inside which the anti-loss and/or path limiting device is arranged. Since the anti-loss and/or path limiting device is arranged inside the through openings, the anti-loss and/or path limiting device strikes the elastomer springs at a maximum deflection of the damping mass, so that the resulting noise is damped and thus the driving comfort is improved.

The anti-loss and/or path limiting device can fix the spring device on the damping mass. This is advantageous in particular when the spring device is manufactured separately to the damping mass. To that end, the spring device can have a radially inwardly protruding projection, which interacts with a collar that is radially circumferential around the anti-loss and/or path limiting device. Preferably, the spring device is preloaded via the anti-loss and/or path limiting device on the damping mass in order to prevent a disengagement of the elastomer spring from the damping mass during a movement of the damping mass.

In a preferred embodiment, the spring device is provided with annular structures each end-side. For example, one of the annular structures can be formed as a ring and the other annular structure can be formed as an L-shaped ring in cross section. The annular structures can be in a bonded connection with the spring device. Thus, the annular structures can be vulcanized onto the spring device formed as elastomer springs. Preferably, a respective one of annular structures is arranged on one front face of the elastomer springs. Thus, the annular structure formed as a ring can be arranged on the front face of the elastomer spring facing the damping mass, while the annular structure formed as an L-shaped ring can be arranged on the front face of the elastomer spring facing the retaining device. The annular structures can be manufactured from plastics or steel.

Preferably, the spring device is fixed to the retaining device and/or the damping mass via the annular structures. Thus, the annular structure formed as an L-shaped ring can be pressed into the receiving eye of the retaining device. The annular structure formed as a ring can be fixed to the damping mass via the pin elements. To that end, the ring can have a smaller inner diameter than the through opening formed in the elastomer spring, wherein a collar being circumferential around the anti-loss and/or path limiting device can fit closely to the ring in order to fix the elastomer spring to the damping mass.

The damping mass can be a cylinder. A damping mass formed as a cylinder can be manufactured easily and cost efficiently. Further, the damping mass can also have any other conceivable shape. Thus, the damping mass can be rectangular, quadratic or circular in cross section. Further, the damping mass can have a sidecut in cross section.

In a preferred embodiment, the retaining device is formed as a retaining plate, wherein the retaining plate has one support plate and two legs protruding from the support plate. Attachment of the retaining plate to the motor vehicle part is accomplished via the support plate. To that end, the support plate can have openings, into which the retaining devices can be inserted. Further, the support plate can also be in a bonded connection with the motor vehicle part. The legs protruding from the support plate can be formed by bending both of the end-side sections of the support plate. The legs can also be referred to as lugs.

Preferably, the damping mass is arranged between the legs, wherein the legs have the stop devices. In particular, the receiving eyes forming the stop devices, into which the pin elements are protruding and to which the spring devices are in a form-fit connection, in a force-locking connection, and/or in a bonded connection, are provided in the legs.

BRIEF DESCRIPTION OF THE DRAWINGS

The vibration damper as well as further features and advantages are subsequently explained in more detail on the basis of embodiments, which are schematically shown in the figures. Hereby depict.

DETAILED DESCRIPTION

Figure 1:
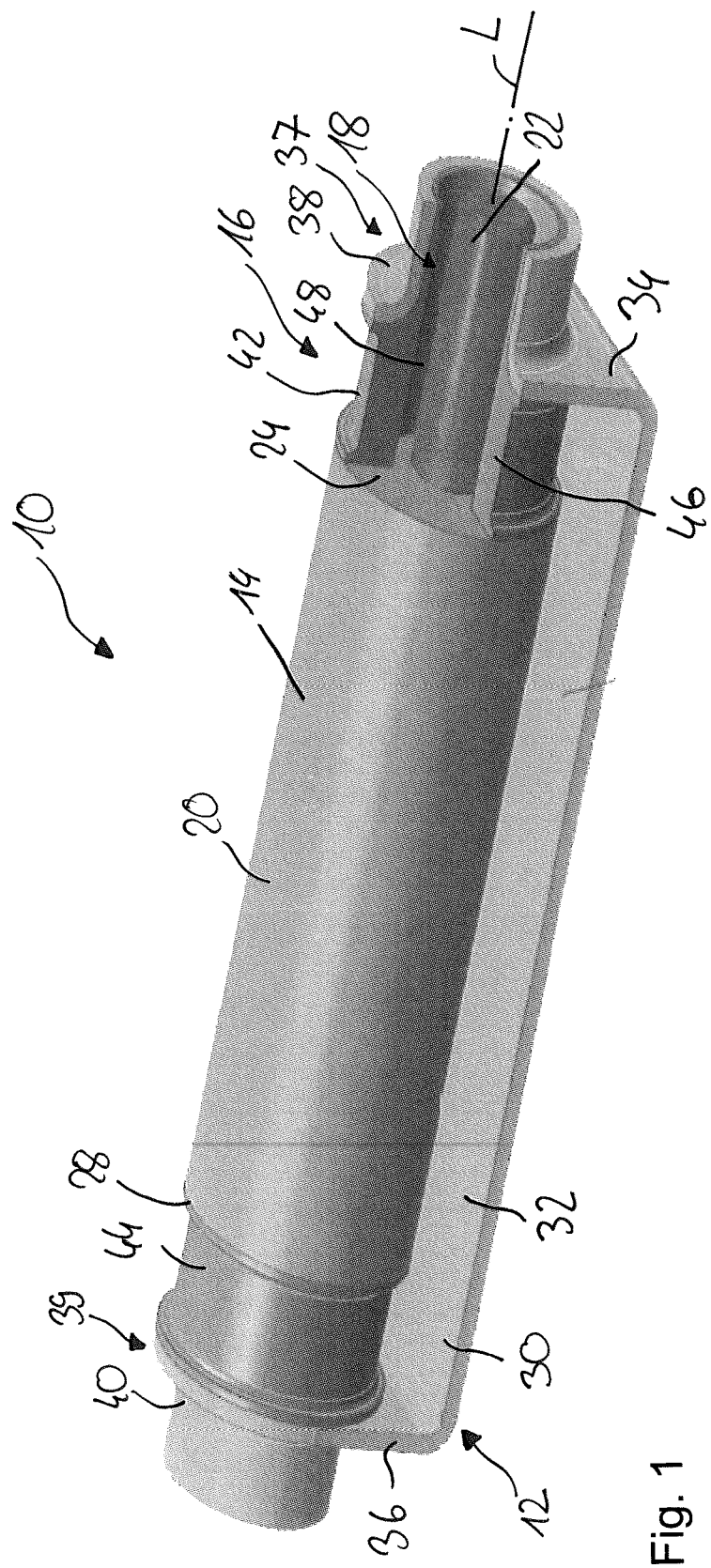
FIG. 1 a perspective view of a vibration damper according to a first embodiment consisting of a partial section in the area of the damping, a spring device and a receiving eye.

In FIG. 1 a vibration damper 10 according to a first embodiment is shown, which serves for damping vibrations of a motor vehicle part (not shown), in particular of a tailgate or a roof of a motor vehicle.

The vibration damper 10 comprises a retaining device 12 attachable to the motor vehicle part, a damping mass 14, capable of vibrating with respect to the retaining device 12, and a spring device 16 coupling the damping mass 14 capable of vibrating to the retaining device 12.

The damping mass 14 has the shape of a cylinder and has an anti-loss and/or path limiting device 18, which interacts with the retaining device 12 in order to limit the deflection of the damping mass 14 with respect to the retaining device 12.

As is evident from FIG. 1, the anti-loss and/or path limiting device 18 has pin elements 22, wherein one of the pin elements 22 is arranged on a first front face 24 of the damping mass 14 and the other pin element 22 is arranged on a second front face 28 of the damping mass 14. Both of the present pin elements 22 are formed as studs, turned from end-side sections of the damping mass 14 or inserted into an opening which is provided in the front faces 24, 28. The pin elements 22 are thereby arranged on the front faces 24, 28 such that the longitudinal axes of the pin elements 22 are aligned with the longitudinal axis L of the damping mass 14.

The retaining device 12 is formed as a retaining plate 30, which consists of a support plate 32, a first leg 34 protruding from the support plate, and a second leg 36 protruding from the support plate 32, wherein the first leg 32 has a first stop device 37 and the second leg 34 has the second stop device 39, which interact with the pin elements 22 in order to limit the deflection of the damping mass 14 with respect to the retaining device 12. Attachment of the vibration damper 10 to the motor vehicle part (not shown) takes place via the support plate 32. To that end, the support plate 32 can be provided with openings (not shown), into which fastening elements, such as screws, can be inserted.

Both of the legs 34, 36 are formed by bending of the end-side sections of the support plate 32. The first leg 34 has a first receiving eye 38 and the second leg has a second receiving eye 40. Both of the receiving eyes 38, 40 thereby form the stop devices 37, 39. Each of the receiving eyes 38, 40 is formed from an opening inserted into the legs 34, 36 and a sleeve-like extension protruding from both of the legs 34, 36.

The spring device 16 comprises a first elastomer spring 42 coupling the damping mass 12, in particular the first front face 24, with the first receiving eye 38, and a second elastomer spring 44 coupling the damping mass 14, in particular the second front face 28, with the second receiving eye 40. To that end, both of the elastomer springs 42, 44 are vulcanized onto the front faces 24, 28 as well as onto the legs 34, 36 and onto the inner faces of the receiving eyes 38, 40.

As is apparent from FIG. 1, the elastomer springs 32, 34 are formed as hollow cylinders 46, wherein the pin elements 22 extend inside a through opening 48, so that the elastomer springs 32, 34 surround the pin elements 22.

In the following, the operating principle of the vibration damper 10 will be explained. The vibrations of a motor vehicle part connected to the vibration damper 10 are transferred to the damping mass via the retaining device 12 and the spring device 16. As a result, the damping mass 14 is deflected with respect to the retaining device 12 and starts vibrating, wherein the vibrations are damped via both of the elastomer springs 42, 44 and are thus decoupled from the passenger cabin. Thereby, no disturbing rattling noises from the motor vehicle part are perceived inside the passenger cabin. The anti-loss and/or path limiting device 18, in particular the pin elements 22, limit the deflection of the damping mass 14 with respect to the retaining device 12, wherein the pin elements 22 strike the elastomer springs 42, 44 arranged inside the receiving eyes 38, 40. Thereby, an overloading of the elastomer springs 42, 44 is actively prevented, so that the vibration damper 10 has a long operating life. In addition, the pin elements 22 act as loss protection, so that the damping mass 14 cannot disengage from the retaining device 12 in case of a failure of the elastomer springs 42, 44. Moreover, the elastomer springs 42, 44 arranged inside the receiving eyes 38, 40 damp the noises occurring while the pin elements strike.

In the following, embodiments of the vibration damper 10 are further described, wherein for the purpose of their description preceedingly used reference numbers are used for the same or functionally the same parts.

Figure 2:
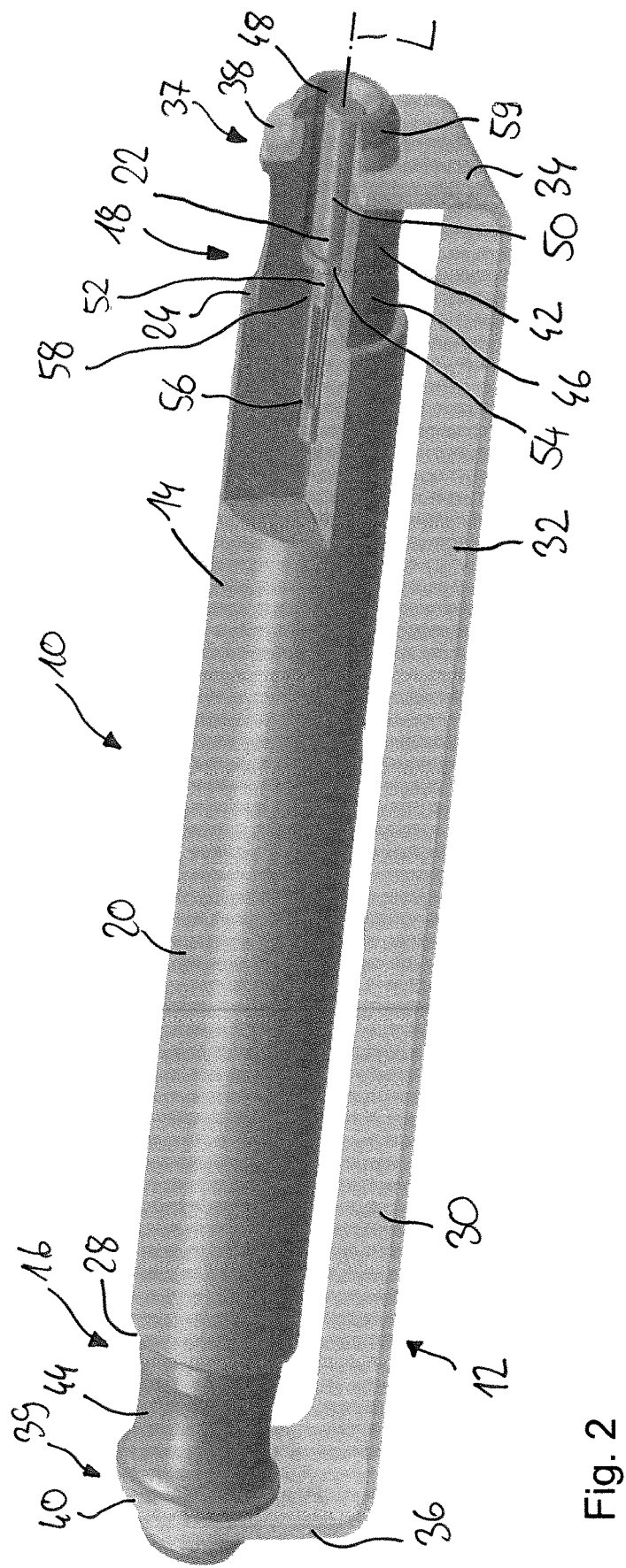
FIG. 2 a perspective view of a vibration damper according to a second embodiment consisting of a partial section in the area of a damping mass, a spring device and a receiving eye.

In FIG. 2, a second embodiment of a vibration damper 10 is shown, which differs from the first embodiment with respect to the design of the pin elements 22 and the elastomer springs 42, 44 as well as to the attachment of the elastomer springs 42, 44 on the damping mass 14 and the receiving eyes 38, 40.

The pin elements 22 consist of an anti-loss and/or path limiting section 50, an attachment section 52, and a radially circumferential collar 54, separating both of the sections 50, 52 from each other. The anti-loss and/or path limiting section 50 extend through the through opening 48 into the receiving eye 38 and serves to loss protect and/or path limit the damping mass 14. The pin element 22 is attached to the damping mass 14 via the attachment section 52. The present attachment section 52 is inserted, in particular pressed into a borehole 56 provided in the damping mass 14.

The present elastomer springs 42, 44 are separately vulcanized and fixed by means of the pin elements 22 to the damping mass 14 and tied to, in particular snapped into in the receiving eyes 38, 40.

To attach the elastomer springs 42, 44 to the damping mass 14, the elastomer springs 42, 44 have a respective one radially inwardly protruding projection 58, onto which the collar 54 fits closely.

To attach the elastomer springs 42, 44 in the receiving eyes 38, 40, the elastomer springs 42, 44, which engage behind a circumferential edge of the receiving eyes 38, 40, in particular the sleeve-like extensions, are respectively provided with a circumferential latching nose 59 on an end-side.

Figure 3:
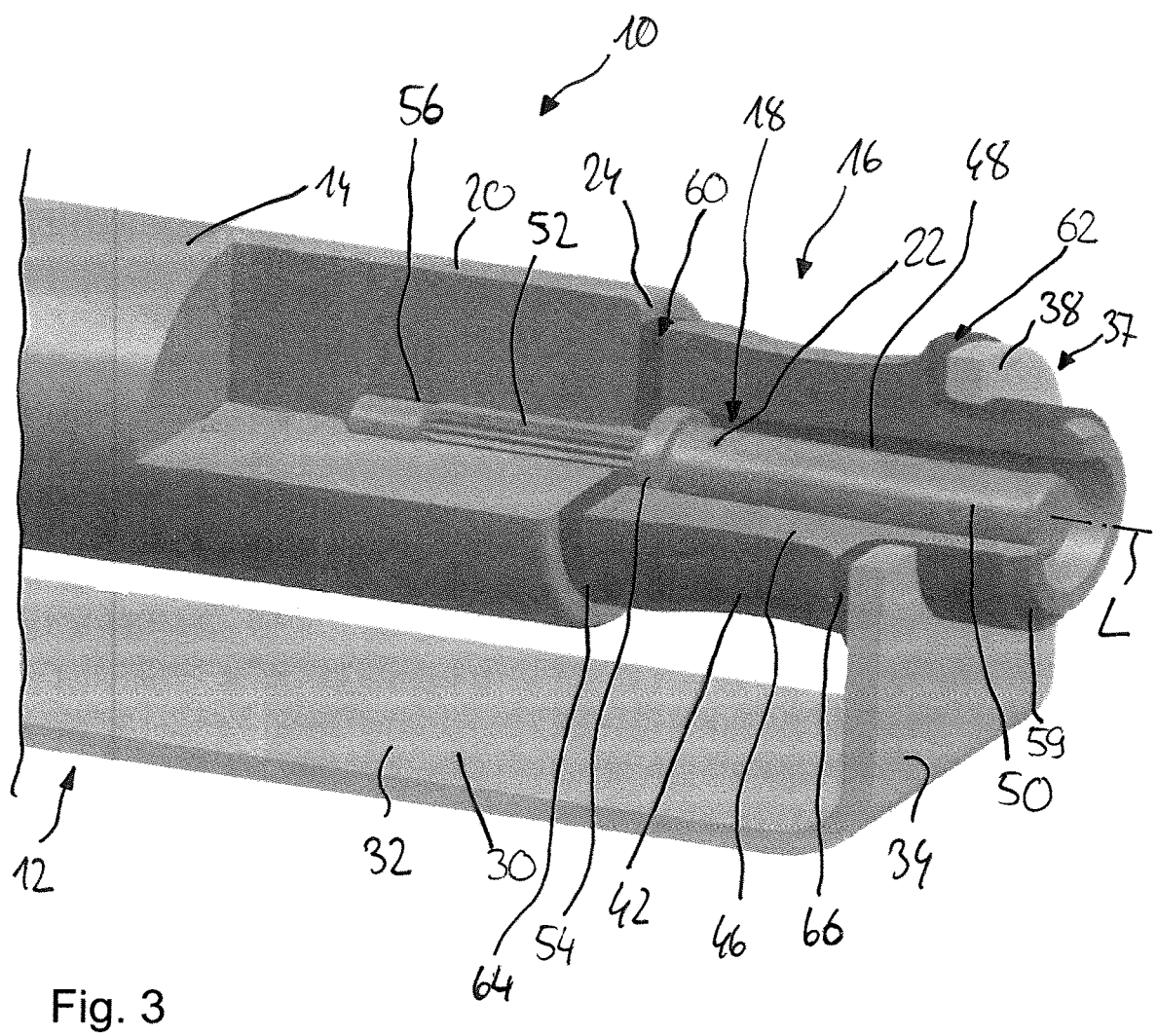
FIG. 3 an enlarged perspective view of the partial section shown in FIG. 2 with a vibration damper according to a third embodiment.

A third embodiment of the vibration damper 10 is shown in FIG. 3, which differs from the second embodiment in that the receiving eyes 38, 40 have no sleeve-like extensions and that the elastomer springs 42, 44 are respectively provided with annular structures 60, 62 on an end-side.

The annular structures 60, 62 are vulcanized onto the elastomer springs 42, 44 and can be manufactured from plastics or steel.

A first annular structure 60 is formed as a ring 64. Attachment of the elastomer spring 42 to the damping mass 14 is accomplished via the ring 64. As is apparent from FIG. 3, the ring 64 has a smaller inner diameter than the through opening 48. The collar 54 closely fits on the ring 64 in order to fix the elastomer spring 42 to the damping mass 14.

A second annular structure 64 is formed as a ring 66 being L-shaped in cross section, which is engaged behind on the end-side by the circumferential latching nose 59. The elastomer spring 42 is fixed via the L-shaped ring 64 in the receiving eye 38 by pressing the L-shaped ring 66 into the receiving eye 38.

The invention claimed is:

1. Vibration damper for damping vibrations of a motor vehicle part, the vibration damper comprising:
   a retaining device attachable to the motor vehicle part,
   a damping mass configured to vibrate with respect to the retaining device, and
   a spring device coupling the damping mass to the retaining device such that the damping mass is configured to vibrate, the spring device comprising two elastomer springs, and each elastomer spring is connected on a first end to the damping mass and on a second end to the retaining device;
   wherein the damping mass has at least one anti-loss device and/or path limiting device that is arranged inside an opening in each of the elastomer springs and interacts with the retaining device to limit a deflection of the damping mass with respect to the retaining device; and
   wherein the at least one anti-loss device and/or path limiting device has pin elements interacting with stop devices which are integrated into the retaining device, the stop devices being formed as receiving eyes, the pin elements being configured to engage with the receiving eyes, and the receiving eyes being integrally formed with the retaining device and formed as openings in the retaining device; wherein the retaining device is formed as a retaining plate, and the retaining plate has a support plate and two legs protruding from the support plate; and wherein the damping mass is arranged between the two legs, and the two legs comprise the stop devices.

2. Vibration damper according to claim 1, wherein the pin elements are in a form-fit connection, in a force-locking connection, and/or in a bonded connection with the damping mass.

3. Vibration damper according to claim 2, wherein the pin elements are arranged on each front face of the damping mass.

4. Vibration damper according to claim 1, wherein the at least one anti-loss device and/or path limiting device limits the deflection of the damping mass perpendicular to a longitudinal axis of the damping mass.

5. Vibration damper according to claim 1, wherein the two elastomer springs are vulcanized.

6. Vibration damper according to claim 1, wherein the elastomer springs are each bonded to the damping mass and/or the retaining device.

7. Vibration damper according to claim 1, wherein the two elastomer springs are formed as hollow cylinders, and the hollow cylinders have through openings, inside which the at least one anti-loss device and/or path limiting device is arranged.

8. Vibration damper according to claim 1, wherein the at least one anti-loss device and/or path limiting device fixes the spring device to the damping mass.

9. Vibration damper according to claim 1, wherein the spring device is provided with annular structures at each end-side.

10. Vibration damper according to claim 9, wherein the spring device is fixed to the retaining device and/or the damping mass via the annular structures.

11. Vibration damper according to claim 1, wherein the elastomer springs are in a form-fit connection or a force-locking connection with the damping mass and/or the retaining device.

12. Vibration damper for damping vibrations of a motor vehicle part, the vibration damper comprising:
    a retaining device attachable to the motor vehicle part,
    a damping mass configured to vibrate with respect to the retaining device, and
    a spring device coupling the damping mass to the retaining device such that the damping mass is configured to vibrate,
    wherein the damping mass has at least one anti-loss device and/or path limiting device with the retaining device to limit a deflection of the damping mass with respect to the retaining device; the anti-loss device and/or path limiting device comprises pin elements that interact with stop devices of the retaining device; the stop devices are configured as receiving eyes configured to engage the pin elements; and the spring devices includes two elastomer springs that are cohesively connected to the damping mass and the retaining device; and wherein the retaining device is formed as a retaining plate, and the retaining plate has a support plate and two legs protruding from the support plate; and wherein the damping mass is arranged between the two legs, and the two legs comprise the stop devices.

* * * * *